US012493596B2

(12) United States Patent
Hottelier et al.

(10) Patent No.: US 12,493,596 B2
(45) Date of Patent: Dec. 9, 2025

(54) UNSTRUCTURED DATA ANALYTICS IN TRADITIONAL DATA WAREHOUSES

(71) Applicant: Google LLC, Mountain View, CA (US)

(72) Inventors: Thibaud Baptiste Hottelier, Seattle, WA (US); Yuri Volobuev, Walnut Creek, CA (US); Mingge Deng, Kirkland, WA (US); Justin Levandoski, Mountain View, CA (US); Gaurav Saxena, Bothell, WA (US); Deepak Choudhary Nettem, Sunnyvale, CA (US); Anoop Kochummen Johnson, Fremont, CA (US)

(73) Assignee: Google LLC, Mountain View, CA (US)

( * ) Notice: Subject to any disclaimer, the term of this patent is extended or adjusted under 35 U.S.C. 154(b) by 95 days.

(21) Appl. No.: 17/817,987

(22) Filed: Aug. 6, 2022

(65) Prior Publication Data
US 2024/0045845 A1    Feb. 8, 2024

(51) Int. Cl.
*G06F 16/22*  (2019.01)
*G06F 16/338*  (2019.01)

(52) U.S. Cl.
CPC ........ *G06F 16/221* (2019.01); *G06F 16/2282* (2019.01); *G06F 16/338* (2019.01)

(58) Field of Classification Search
CPC .................................................... G06F 16/221
See application file for complete search history.

(56) References Cited

U.S. PATENT DOCUMENTS 8,260,764 B1 *  9/2012  Gruber ................ G06F 16/2428
                                                  707/708
10,963,434 B1 *  3/2021  Rodriguez ............ G06F 16/212
                        (Continued)

OTHER PUBLICATIONS

Gupta Dhruv Dhgupta@MPI-INF MPG De et al, JIGSAW Structuring Text into Tables, Proceedings of the 2019 ACM SIGIR International Conference on Theory of Information Retrieval, ACMPOB27, New York, NY, USA, Sep. 23, 2019, pp. 237-244, XP058470825, DOI: 10.1145/3341981.3344228 ISBN: 978-1-4503-6881-0, abstract section "1 Introduction" section "2 Problem Definition" figure 1.

(Continued)

*Primary Examiner* — Mohammad S Rostami
(74) *Attorney, Agent, or Firm* — Shumaker & Sieffert, P.A.

(57) ABSTRACT

A method for unstructured data analytics in data warehouses includes receiving an unstructured data query from a user, the unstructured data query requesting the data processing hardware determine one or more unstructured data files stored at a data repository that match query parameters. The method includes determining, using an object table, a set of unstructured data files stored at the data repository that matches the query parameters. The object table includes a plurality of rows, each row of the plurality of rows associated with a respective unstructured data file stored at the data repository, and a plurality of columns, each column of the plurality of columns comprising metadata associated with the respective unstructured data file of each row of the plurality of rows. The method includes returning, to the user, a structured data table including the determined set of unstructured data files.

20 Claims, 7 Drawing Sheets

(56) References Cited

U.S. PATENT DOCUMENTS

| | | | | |
|---|---|---|---|---|
| 11,080,279 | B2* | 8/2021 | Morin | G06F 16/3337 |
| 2007/0033199 | A1* | 2/2007 | Fassett | G06F 16/68 |
| 2013/0007000 | A1* | 1/2013 | Indeck | G06F 16/316 |
| | | | | 707/769 |
| 2013/0232171 | A1 | 9/2013 | Cheng et al. | |
| 2016/0147872 | A1* | 5/2016 | Agarwalla | G06F 16/3338 |
| | | | | 707/713 |
| 2017/0103077 | A1* | 4/2017 | Sheinfeld | G06F 16/355 |
| 2017/0169007 | A1* | 6/2017 | Francis | G06F 3/04883 |
| 2019/0228017 | A1* | 7/2019 | El Kaed | G06F 16/2379 |
| 2020/0301941 | A1* | 9/2020 | Wilson | G06F 16/252 |
| 2021/0216983 | A1* | 7/2021 | Glickman | G06Q 20/127 |
| 2021/0225466 | A1* | 7/2021 | Barkan | G06F 16/35 |
| 2021/0279235 | A1* | 9/2021 | He | G06F 16/243 |
| 2021/0286989 | A1* | 9/2021 | Zhong | G06F 40/177 |
| 2021/0319356 | A1* | 10/2021 | Wang | G06V 30/40 |
| 2021/0334561 | A1* | 10/2021 | Pham | G06F 16/2465 |
| 2021/0365306 | A1* | 11/2021 | Haldar | G06F 16/9024 |
| 2021/0365807 | A1* | 11/2021 | Ramsl | G06F 16/35 |
| 2022/0335307 | A1* | 10/2022 | Wang | G06N 5/02 |
| 2023/0049167 | A1* | 2/2023 | Wilson | G06V 30/19107 |
| 2023/0059494 | A1* | 2/2023 | Hunter | G06F 40/279 |
| 2023/0092559 | A1* | 3/2023 | Tekin | G06V 30/412 |
| | | | | 705/7.35 |
| 2023/0123527 | A1* | 4/2023 | Michael | G05B 23/0221 |
| | | | | 702/183 |
| 2023/0367800 | A1* | 11/2023 | Tong | G06N 3/09 |
| 2023/0376828 | A1* | 11/2023 | Zhao | G06N 3/045 |
| 2024/0095445 | A1* | 3/2024 | Sharma | G06F 40/30 |

OTHER PUBLICATIONS

Jungkee Kim, et al., Data Integration Hub for a Hybrid Paper Search, Aug. 17, 2005, Topics In Cryptology—CT-RSA 2020: The Cryptographers' Track at the RSA Conference 2020, San Francisco, CA, USA, Feb. 24-28, 2020, Cornell University Library, 201 Olin Library Cornell University Ithaca, NY 14853, pp. 170-176, XP019015686, the whole document.

International Search Report and Written Opinion from the International Searching Authority for International Application No. PCT/US2023/029548 mailed Oct. 5, 2023.

Response to Communication Pursuant to Rules 161(1) and 162 EPC dated Mar. 13, 2025, from counterpart European Application No. 23761676.8, filed Sep. 12, 2025, 20 pp.

* cited by examiner

UNSTRUCTURED DATA ANALYTICS IN TRADITIONAL DATA WAREHOUSES

TECHNICAL FIELD

This disclosure relates to unstructured data analytics in traditional data warehouses.

BACKGROUND

Analytics programs generally refer to tools that can be used to handle large sets of data, such as those stored in traditional data warehouses. While, these analytics programs are useful for managing, governing, securely sharing/storing, and analyzing big data, they are often rigid in the type of data that can be used. For example, some analytics programs implement structured query language (SQL) for handling data, and, accordingly, are only configured to process structured data. These example analytics programs cannot be used to handle unstructured data without additional manual conversion of the unstructured data into structured data.

SUMMARY

One aspect of the disclosure provides a method for unstructured data analytics in traditional data warehouses. The method, when executed by data processing hardware causes the data processing hardware to perform operations that include receiving an unstructured data query from a user, the unstructured data query requesting the data processing hardware determine one or more unstructured data files stored at a data repository that match query parameters. The operations also include determining, using an object table, a set of unstructured data files stored at the data repository that matches the query parameters. The object table includes a plurality of rows, each row of the plurality of rows associated with a respective unstructured data file stored at the data repository and a plurality of columns, each column of the plurality of columns including metadata associated with the respective unstructured data file of each row of the plurality of rows. The operations further include returning, to the user, a structured data table comprising the determined set of unstructured data files.

Implementations of the disclosure may include one or more of the following optional features. In some implementations, the unstructured data includes images or audio data. Determining the set of unstructured data files may include, for each unstructured data file of the object table, determining that the respective unstructured data file matches the query parameters based on the metadata of the respective unstructured data file and based on determining that the respective unstructured data file matches the query parameters, adding the respective unstructured data file to the set of unstructured data files.

In some implementations, the operations further include, prior to receiving the unstructured data query from the user, generating, using a machine learning model, the object table. In these implementations, generating the object table may include selecting the one or more unstructured data files for the object table based on an object table query. Generating the object table also includes generating the plurality of rows based on a number of the one or more unstructured data files. Further, generating the object table includes determining, using the machine learning model, the metadata included in the object table and generating the plurality of columns based the metadata. Generating the object table also includes populating the object table with references to the one or more unstructured data files and the metadata associated with each respective unstructured data file.

In some implementations, the operations further include, prior to receiving the unstructured data query from the user, generating, using a data scraper, the object table. In other implementations, the metadata comprises at least one of a number of bytes, a type of file, a creation time, a location, or a business metadata. At least one row of the object table may be associated with a row access policy limiting access to the respective unstructured data file. In some implementations, the operations further include periodically updating the object table based on changes at the data repository. In these implementations, the object table may be updated based on a refresh rate.

Another aspect of the disclosure provides a system for unstructured data analytics in traditional data warehouses. The system includes data processing hardware and memory hardware in communication with the data processing hardware. The memory hardware stores instructions that when executed on the data processing hardware cause the data processing hardware to perform operations. The operations include receiving an unstructured data query from a user, the unstructured data query requesting the data processing hardware determine one or more unstructured data files stored at a data repository that match query parameters. The operations also include determining, using an object table, a set of unstructured data files stored at the data repository that matches the query parameters. The object table includes a plurality of rows, each row of the plurality of rows associated with a respective unstructured data file stored at the data repository and a plurality of columns, each column of the plurality of columns including metadata associated with the respective unstructured data file of each row of the plurality of rows. The operations further include returning, to the user, a structured data table comprising the determined set of unstructured data files.

This aspect may include one or more of the following optional features. In some implementations, the unstructured data includes images or audio data. Determining the set of unstructured data files may include, for each unstructured data file of the object table, determining that the respective unstructured data file matches the query parameters based on the metadata of the respective unstructured data file and based on determining that the respective unstructured data file matches the query parameters, adding the respective unstructured data file to the set of unstructured data files.

In some implementations, the operations further include, prior to receiving the unstructured data query from the user, generating, using a machine learning model, the object table. In these implementations, generating the object table may include selecting the one or more unstructured data files for the object table based on an object table query. Generating the object table also includes generating the plurality of rows based on a number of the one or more unstructured data files. Further, generating the object table includes determining, using the machine learning model, the metadata included in the object table and generating the plurality of columns based the metadata. Generating the object table also includes populating the object table with references to the one or more unstructured data files and the metadata associated with each respective unstructured data file.

In some implementations, the operations further include, prior to receiving the unstructured data query from the user, generating, using a data scraper, the object table. In other implementations, the metadata comprises at least one of a number of bytes, a type of file, a creation time, a location, or a business metadata. At least one row of the object table may be associated with a row access policy limiting access to the respective unstructured data file. In some implementations, the operations further include periodically updating the object table based on changes at the data repository. In these implementations, the object table may be updated based on a refresh rate The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Analytics programs, such as those that implement structured language query (SQL), can be used to handle large sets of structured data, such as numbers and strings, or data that can be represented in rows, columns within rational databases. The databases typically are not configured to process unstructured data (e.g., images, audio, video, word processing files, emails, spreadsheets), which usually encompasses a majority of data available to a user. Integrating unstructured data for an analytics program using conventional methods involves manual input and other inflexible solutions. For example, preparing unstructured data for an analytics program includes extracting structured entities from the unstructured data using a machine learning model. However, this extraction process incurs high implementation and time-to-value costs. Further, lineage information between the unstructured data and the extracted structured data is difficult to maintain, causing additional barriers.

Implementations herein provide unstructured data for use in analytics programs configured to process structured data through the use of object tables. As used herein, an object table is an index of unstructured data that can be used by downstream analytics or processing programs. In some implementations, an object table is a collection of files (i.e., unstructured data) stored or referenced in a tabular database. For example, an object table includes multiples rows and columns where each row corresponds to a single file of unstructured data, and each column corresponds to metadata related to the files (such as metadata extracted from file headers of the files). In some implementations, the analytics program can then ingest the unstructured data via the object table as structured data. In other implementations, the analytics program can infer one or more structured tables from the object table and then use the one or more structured tables as structured data. The analytics program may thus process unstructured data as if it was structured data (i.e., all the analytics programs processing tools and security features may be applied to the unstructured data).

Figure 1:
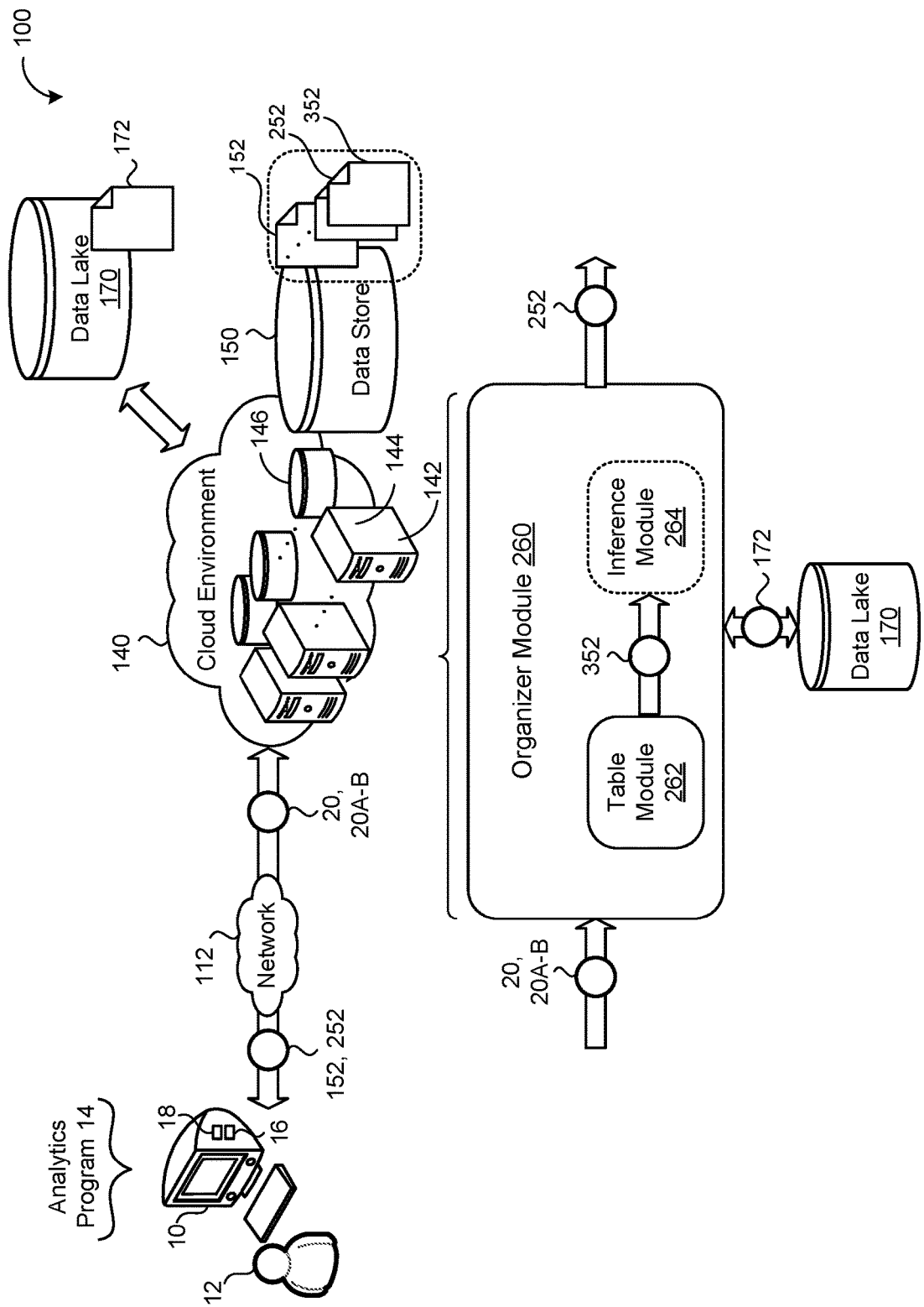
FIG. 1 is a schematic view of an example object table system for unstructured data analytics in traditional data warehouses.

Referring to FIG. 1, in some implementations, an example object table system 100 includes a remote system 140 in communication with one or more user devices 10 via a network 112. The remote system 140 (also referred to herein as cloud computing environment 140) may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store structured data 152, structured data tables 252, and one or more object tables 352. The data store 150 may store any number of structured data 152, structured data tables 252, and object tables 352 at any point in time. The data lake 170 may be part of the remote system 140 or otherwise communicatively coupled to the remote system 140. The data lake 170 may store unstructured data files 172 such as audio, video, images, word documents, spreadsheets, social media content, emails, etc.

The remote system 140 is configured to receive an unstructured data query 20, and/or an object table query 20, 20B from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the unstructured data query 20A and/or the object table query using an analytics program 14 (e.g., via an analytics program executing on the user device 10 and/or remote system 140). Each query 20 requests one or more unstructured data files 172 (or references to one or more unstructured data files 172) be returned to the user device 10. In some examples, the unstructured data query 20A requests the remote system 140 return a structured data table 252 based on an object table 352. The structured data table 252 is a table including unstructured data files 172 (and/or references to unstructured data files 172, such as a link to a location where the unstructured data file 172 is stored) in a form that can be ingested by the analytics program 14. The structured data tables 252 can be generated based on the unstructured data query 20A with data (i.e., unstructured data files 172) extracted from the object table 352. The object table 352 is a larger data table including unstructured data files 172 (or references to unstructured data files 172) from the data lake 170. In some implementations, the object table 352 is generated in response to an object table query 20B. Alternatively, the object table 352 may be pre-generated. The object table 352 may include each unstructured data file 172 (or reference to each unstructured data file 172) in the data lake 170. In other implementations, the object table 352 includes a subset of the unstructured data files 172 in the data lake 170. Both the structured data table 252 and the object table 352 are tables that include unstructured data files 172 that are organized such that they are ingestible by the analytics program 14 (e.g., by being in a tabular form).

The tables 252, 352 may include the actual data from the unstructured data file 172 and/or a reference to the unstructured data file 172 in the data lake 170 (such that the analytics program 14 can retrieve the unstructured data files 172 from the data lake 170). Unstructured data files 172 can refer to any unstructured data such as audio, video, images, emails, spreadsheets, word documents, etc.

The remote system 140 executes an organizer module 260 that includes a table module 262 and an inference module 264. The organizer module 260 generates and provides one or more structured data tables 252 to the user device 10 in response to the unstructured data query 20A. The table module 262 may generate an object table 352 (e.g., in response to an object table query 20B) storing or referencing unstructured data files 172 and corresponding information (e.g., metadata 305 (FIG. 3)) in rows and columns. The organizer module 260 accesses the object table 352 based on received query parameters (i.e., from the unstructured data query 20A) to return the desired results. In some implementations, the table module 262 periodically updates the object table 352 and/or structured data table 252 based on data that has been changed, added, or deleted from the data lake 170. The table module 262 may be a machine learning model trained to select unstructured data files 172 and corresponding metadata 305 for the object table 352 and/or structured data table 252. In some implementations, the table module 262 is a data scraper that selects some or all of the unstructured data files 172 and scrapes metadata 305 from headers of the respective unstructured data files 172 to populate the object table 352 and/or structured data table 252.

In some implementations, the object table 352 includes or references at least a portion of the unstructured data files 172 stored in the data lake 170. Upon receiving the unstructured data query 20A, the inference module 264 may generate one or more structured data tables 252 using the object table 352 and the query 20A (e.g., query parameters of the query 20A), for use by the analytics program 14. For example, the unstructured data query 20A includes query parameters in the form of one or more SQL statements indicating specific file types or other criteria based on metadata 305 included in the unstructured data file 172 (e.g., select all .jpg files). In other implementations, the analytics program 14 receives and processes the entire object table 352.

The structured data 152, the structured data table 252, and the object data table 352 may all be stored in the data store 150 of the cloud computing environment 140. Here, the structured data 152 is any traditional structured data that can be ingested by the analytics program 14 without further modification. In some examples, the structured data tables 252 and the object table 352 include properties that cannot traditionally be applied to unstructured data files 172. For example, the structured data table 252 can be transferred securely and can also include customized access settings for each unstructured data file 172 in the object table 352. For example, as discussed in more detail below, the remote system 140 implements one or more row access control policies for the object table 352 that restrict access to the unstructured data files 172 in a manner not feasible when restricting access to the unstructured data files 172 directly.

Figure 2:
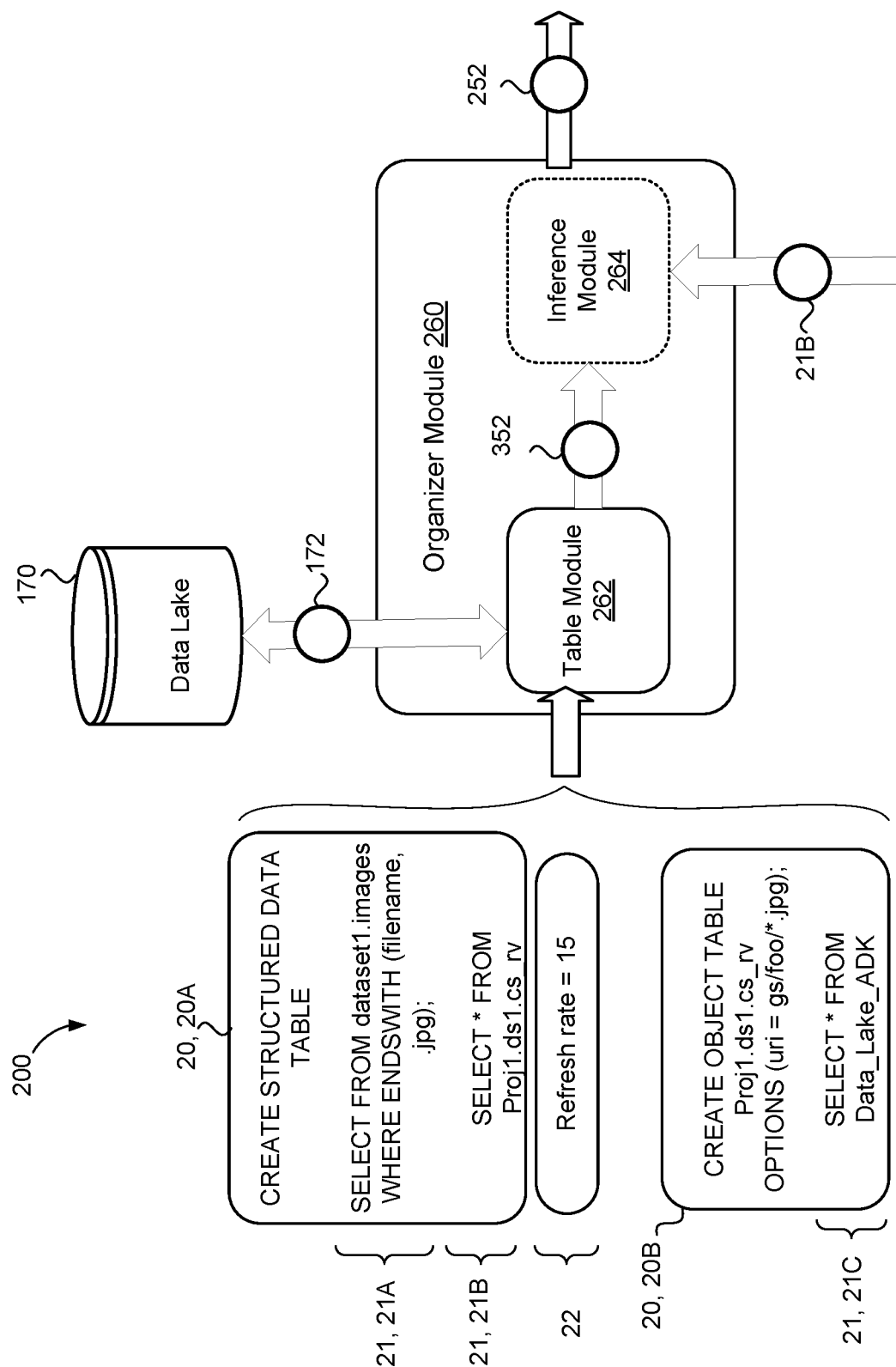
FIG. 2 is a schematic view of an example organizer module generating one or more structured tables.

FIG. 2 is a schematic view 200 includes an example of the organizer module 260 generating one or more structured tables 252. As described above, the organizer module 260 may receive an unstructured data query 20A or an object table query 20B. The unstructured data query 20A may include query parameters 21, 21A-B such as a data type 21, 21A and/or a criteria 21, 21B. The data type 21A may indicate which unstructured data files 172 the table module 262 is to select for the structured data table 252 from the object table 352. For example, the data type 21A simply indicates selecting all JPEG files in the object table 352. In another example, the data type 21A may indicate a specific customer. Here, the table module 262 is a machine learning model trained on selecting data for the specific customer and generates the structured table 252 accordingly. The table module 262 may be a machine learning model, a data scrapper, or any other suitable module that can generate an object table 352 and/or structured table 252 including unstructured data files 172 and related metadata 305.

The criteria 21B may be an indication of unstructured data files 172 to be placed in the structured data table 252. Thus, the inference module 264 may generate one or more structured data tables 252 from the object table 352 based on the criteria 21B. For example, the inference module 264 checks each unstructured data file 172 of the object table 352 to determine if the unstructured data file 172 matches the criteria 21B. When the unstructured data file 172 matches the criteria 21B, the inference module 264 places the unstructured data file 172 in the structured data table 252. The inference module 264 traverses the entire object table 352, selecting a set of unstructured data files 172 for the structured data table 252 that satisfy the query parameters 21.

The organizer module 260 may receive a refresh rate 22. The refresh rate 22 may indicate how often to update the object table 352 or the structured data table 252. For example, based on the refresh rate 22, the organizer module 260 periodically updates the object table 352 or structured data table 252 when determining that one or more unstructured data files 172 have been changed, added, or deleted from the data lake 170. The organizer module 260 may implement either the table module 262 and/or the inference module 264 to add or remove respective rows in the respective tables 352, 252. In some implementations, the refresh rate 22 is a preset value. Here, the refresh rate 22 can be modified by a user input upon creation of the structured data table 252 or at a later time.

In some implementations, the object table 352 is pre-generated based on the data lake 170. For example, the object table 352 includes each unstructured data file 172 in the data lake 170. Alternatively, the object table 352 includes each unstructured data file 172 of certain type based on the metadata 305 (e.g., all files of a certain type, based on creation time, based on size). In some implementations, the object table 352 is generated based on an object table query 20B. For example, the object table query 20B can include instructions to create an object table 352, with query parameters 21 indicating the unstructured data files 172 from the data lake 170 to include in the object table 352. The object table query 20B may include a data lake specification 21, 21C as a query parameter 21, along with any of the above mentioned query parameters 21. In some implementations, the query 20 and the corresponding query parameters 21 and/or refresh rate 22 are received as script in a programming language (e.g., SQL). The organizer module 260, using table module 262 and inference module 264, may generate an object table 352 and/or one or more structured data tables 252 based on the script in the unstructured data query 20.

The above example queries 20 are not intended to be limiting, and the query can include any relevant instructions for generating the structured data table 252 and/or the object table 352.

Figure 3:
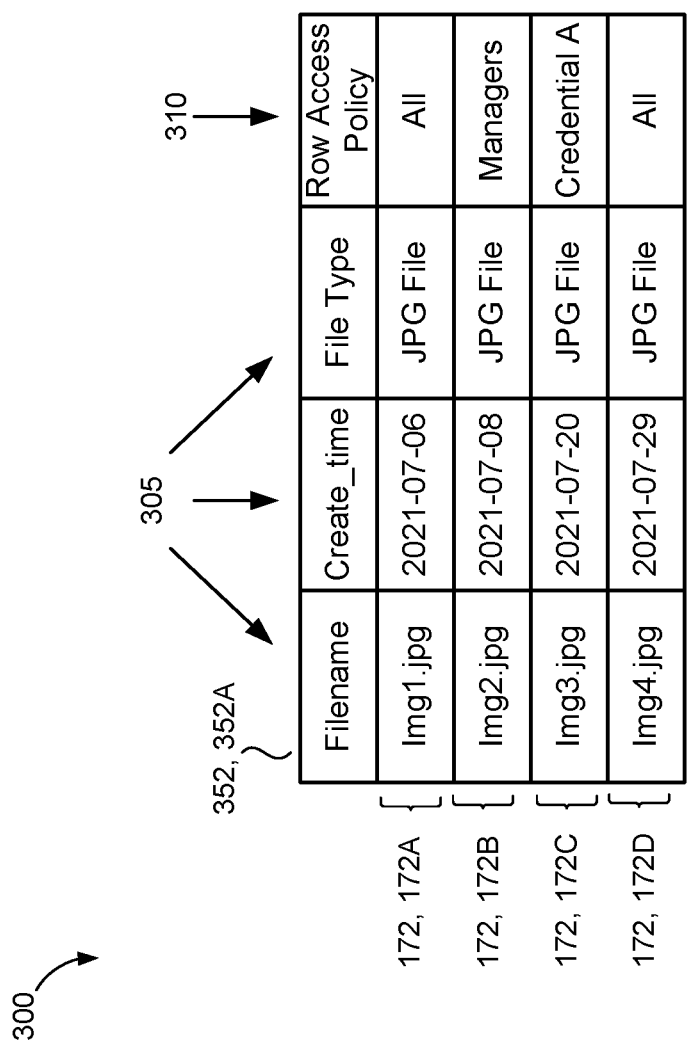
FIG. 3 is a schematic view of an example object table.

Referring now to FIG. 3, a schematic view 300 includes an example object table 352, 352A. The example object table 352A includes four unstructured data files 172, 172A-D each corresponding to a respective row of the object table 352A. Each column of the example object table 352A corresponds to metadata 305 or a row access policy 310 (included as a column of the object table 352A for illustrative purposes). Accordingly, each cell of the example object table 352A includes metadata 305 corresponding to a respective unstructured data file 172. The example object table 352A is not intended to be limiting and can include any suitable number of rows and columns based on the number of unstructured data files 172 and the different pieces of metadata 305, respectively, used to generate the object table 352. The metadata 305 can include any information that can be retrieved, derived, or determined for the respective unstructured data file 172 such as a file name, a number of bytes, a type of file, a creation time, a location, business metadata (e.g., specific metadata added to a file by a business), classification data (e.g., generated by a machine learning model), user provided data, labels, etc.

By organizing unstructured data files 172 into a table (e.g., object table 352 or structured data table 252) and storing the table in the cloud computing environment 140, the system can apply features to the unstructured data files 172 that are typically reserved for structured data in an analytics program environment. For example, when retrieving unstructured data files 172 from the data lake 170, access to each unstructured data file 172 is binary (i.e., yes access to the file is possible, or no access to the file is not possible). Moreover, by organizing the unstructured data files 172 into a structured form (e.g., object table 352 or structured data table 252), each unstructured data file 172 may have a specific row access policy 310 controlling access to the unstructured data file 172 at a row or even a column. That is, when a user 12 does not have access to at least a portion of a row of the object table 352, the remote system 140 may prohibit access to the protected data or even to the unstructured data file 172 itself.

Figure 4A:
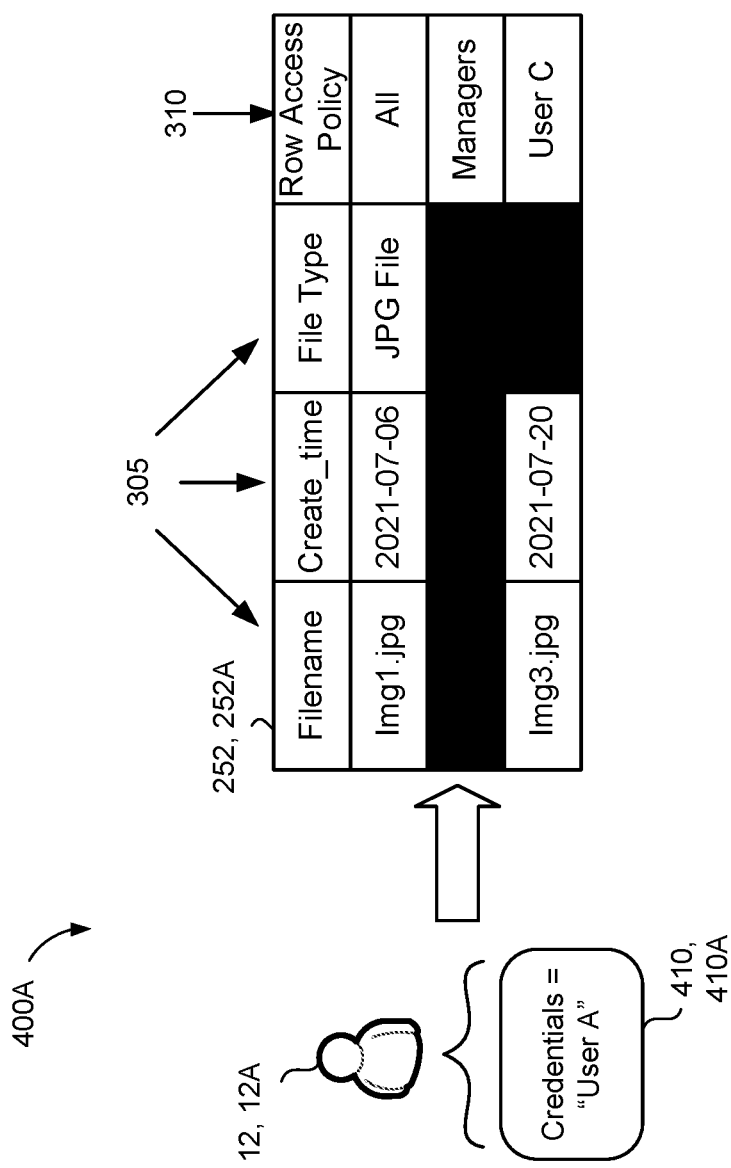
FIG. 4A is a schematic view of an example structured table viewed by a first user.

Referring now to FIG. 4A, a schematic view 400A includes an example structured table 252, 252A. In this example, the structured table 252A includes a column that indicates a filename for each unstructured data file 172, a creation time for each unstructured data file 172, file type for each unstructured data file 172, and a row access policy 310 for each row of the table 252A. Here, the inference module 264 generates the example structured table 252A from the example object table 352A of FIG. 3. For example, the structured data tables 252A can include any unstructured data files 172 that were extracted from the object table 352A, including the corresponding row access policy 310 and metadata 305 for each unstructured data file 172. In this example, a first user 12, 12A viewing the structured data table 252A has first credentials 410, 410A that are equivalent to "User A." Accordingly, the first user 12A lacks access to particular cells of the structured data table 252A (as indicated by the blacked out cells) because the first user 12 does not have credentials 410A that are sufficient to access those cells. For example, because the credentials 410A of the first user 12A are not equivalent to "Managers" the first user 12A cannot access the second row of the table 252A at all. Similarly, because the credentials 410A of the first user 12A are not equivalent to "User C," the first user 12A lacks access to a portion of the third row of the table 252A.

Figure 4B:
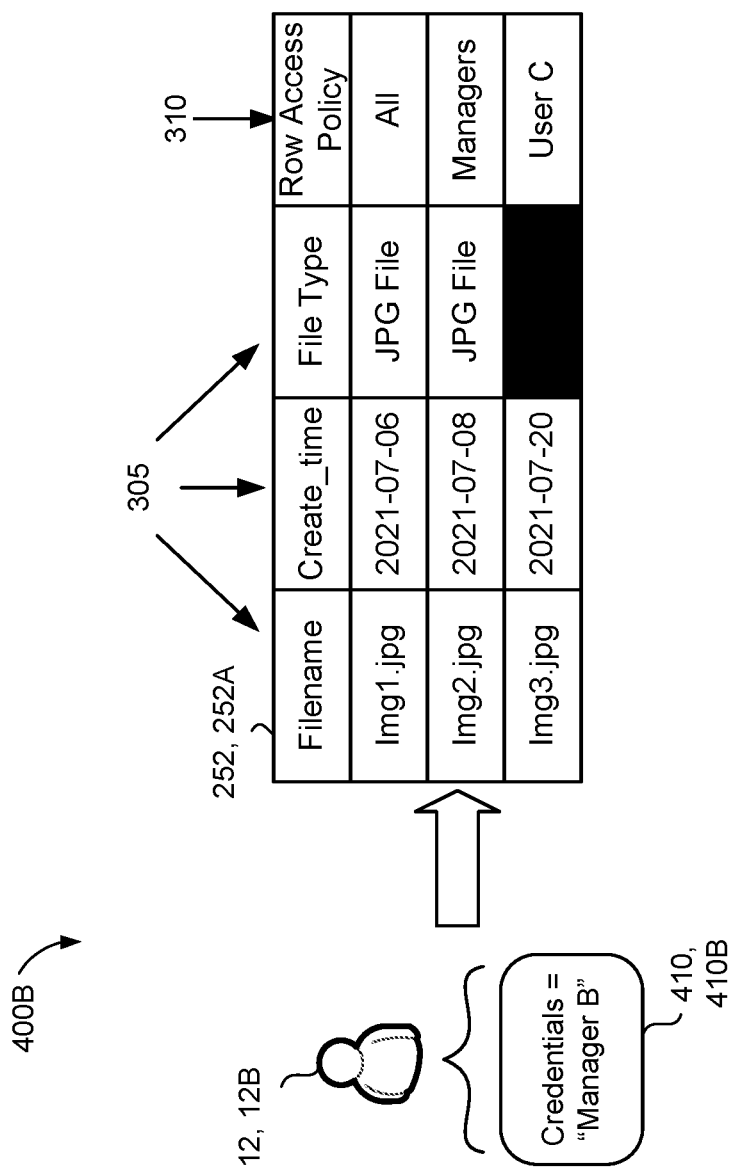
FIG. 4B is a schematic view of an example structured table viewed by a second user.

Referring now to FIG. 4B, a schematic view 400B includes the same example structured table 252A. Here, a second user 12, 12B has different access credentials than the first user 12A and, accordingly, has different access to the unstructured data files 172 of the example structured data table 252A. Specifically, the second user 12B has credentials 410, 410B equivalent to "Manager B" and thus has access to the second row of the table 252A (i.e., because the second user 12B has manager-level access). However, because the second user 12B does not have credentials 410B equivalent to "User C," the second user 12B also lacks access to the portion of the third row of the table 252A.

The example structured data table 252A is not intended to be limiting and can include any suitable number of rows and columns based on the number of unstructured data files 172 and the different pieces of metadata 305, respectively, used to generate the object table 352. For example, the structured data table 252 can include any data extracted from object table 352. The metadata 305 can include any information that can be retrieved, derived, or determined for the respective unstructured data file 172 such as a file name, a number of bytes, a type of file, a creation time, a location, business metadata (e.g., specific metadata added to a file by a business), classification data (e.g., generated by a machine learning model), user provided data, labels, etc. Similar row access controls can be alternatively or additionally applied to the object table 352.

Figure 5:
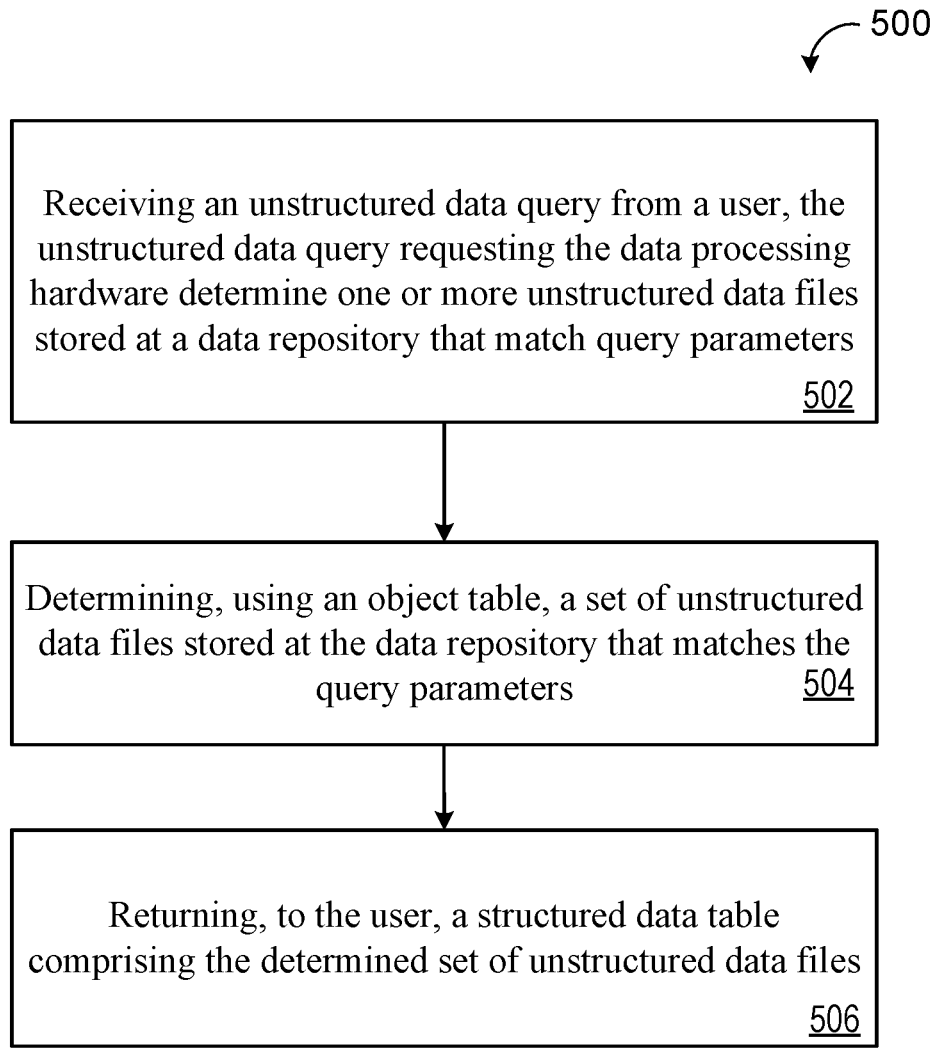
FIG. 5 is a is a flow chart of an exemplary arrangement of operations for a method for unstructured data analytics in traditional data warehouses

FIG. 5 is a flowchart of an exemplary arrangement of operations for a method 500 for unstructured data analytics in traditional data warehouses. The data processing hardware 142 of the remote system 140 may execute instructions stored on the memory hardware 144 that cause the data processing hardware 142 to perform the operations for the method 500. The method 500 may be performed by various elements of the object table system 100 of FIG. 1 and/or the computing device 600 of FIG. 6. At operation 502, the method 500 includes receiving an unstructured data query 20A from a user 12, the unstructured data query 20A requesting data processing hardware 144 determine one or more unstructured data files 172 stored at a data repository 170 (e.g., a data lake 170) that match query parameters 21 of the query 20A. At operation 504, the method 500 includes determining, using an object table 352, a set of unstructured data files 172 stored at the data repository 170 that matches the query parameters 21. The object table 352 includes a plurality of rows, each row of the plurality of rows associated with a respective unstructured data file 172 stored at the data repository 170 and a plurality of columns and each column of the plurality of columns including metadata 305 associated with the respective unstructured data file 172 of each row of the plurality of rows. At operation 506, the method 500 further includes returning, to the user 12, a structured data table 252 comprising the determined set of unstructured data files 172.

Figure 6:
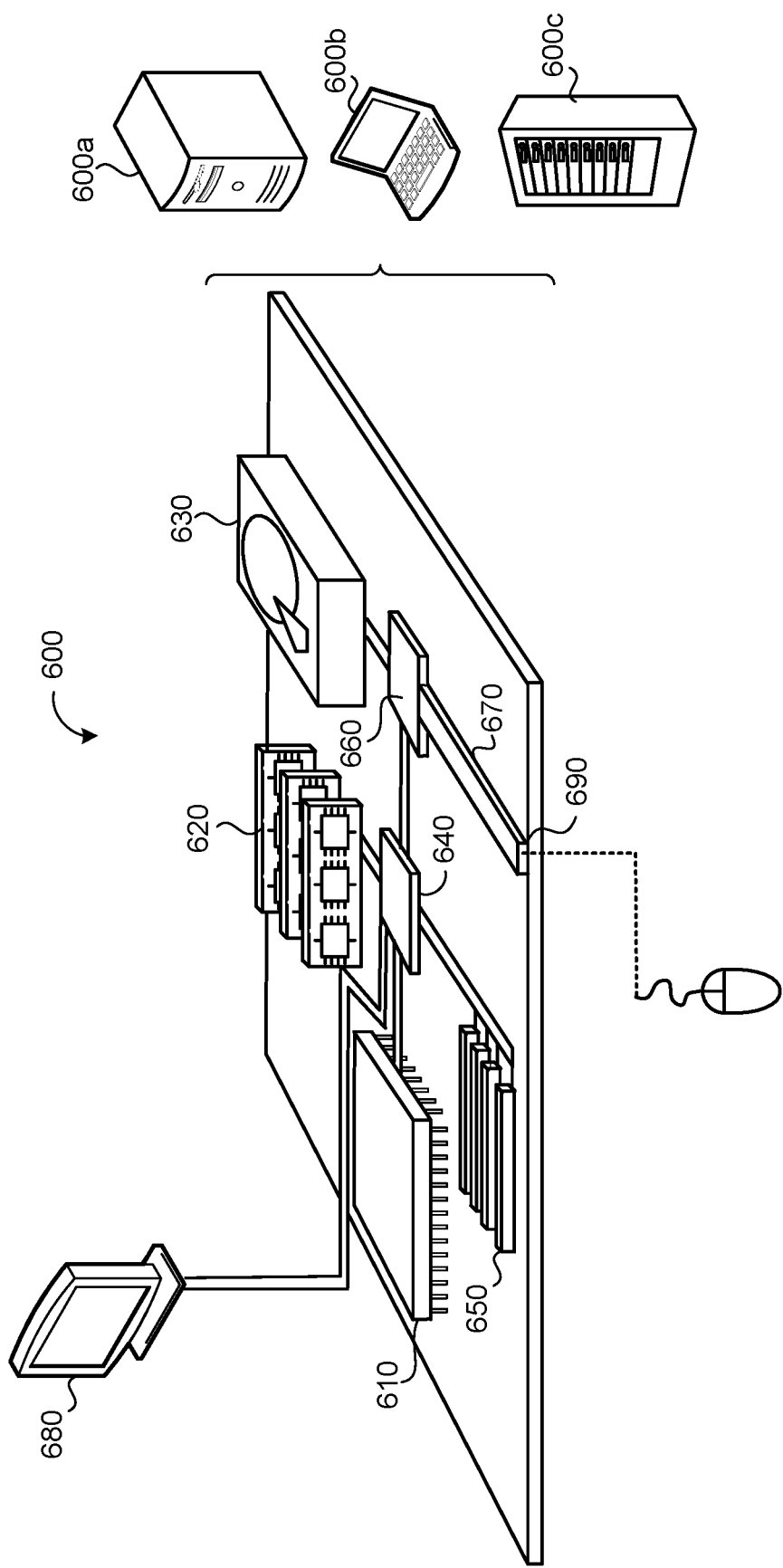
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
generating, by data processing hardware and using a machine learning model, an object table, wherein the object table indexes unstructured data files stored at a data repository, the object table comprises:
a plurality of rows, each row of the plurality of rows corresponds to a respective unstructured data file stored at the data repository; and
a plurality of columns, each column of the plurality of columns comprising metadata associated with the respective unstructured data file of each row of the plurality of rows, wherein the metadata includes pre-existing metadata embedded within an unstructured data file;
receiving, by the data processing hardware via a network, an unstructured data query from a user device executing an analytics program configured to ingest structured data tables, the unstructured data query requesting the data processing hardware extract one or more unstructured data files from the unstructured data files stored at the data repository that match query parameters;
extracting, by the data processing hardware and using the object table, a set of unstructured data files from the unstructured data files stored at the data repository that matches the query parameters to produce an extracted set of unstructured data files, wherein the query parameters are matched based on the metadata associated with each unstructured data file;
generating, by the data processing hardware, a structured data table comprising a location where each unstructured data file of the extracted set of unstructured data files is stored at the data repository and the metadata associated with each of the extracted set of unstructured data files; and
returning, by the data processing hardware and to the user device, the structured data table, the structured data table, when received by the user device, is configured to cause the analytics program to process the extracted set of unstructured data files by way of the structured data table.

2. The method of claim 1, wherein the one or more unstructured data files comprises images or audio data.

3. The method of claim 1, wherein extracting the set of unstructured data files comprises, for each unstructured data file of the object table:
determining, by the data processing hardware, that the respective unstructured data file matches the query parameters based on the metadata of the respective unstructured data file; and
based on determining that the respective unstructured data file matches the query parameters, adding, by the data processing hardware, the respective unstructured data file to the set of unstructured data files.

4. The method of claim 1, wherein generating the object table occurs before receiving the unstructured data query.

5. The method of claim 1, wherein generating the object table comprises:
selecting, by the data processing hardware, the one or more unstructured data files for the object table based on an object table query;
generating, by the data processing hardware, the plurality of rows based on a number of the one or more unstructured data files;
determining, by the data processing hardware and using the machine learning model, the metadata included in the object table
generating, by the data processing hardware, the plurality of columns based on the metadata; and
populating, by the data processing hardware, the object table with references to the one or more unstructured data files and the metadata associated with each respective unstructured data file.

6. The method of claim 1, wherein generating the object table comprises generating the object table using a data scraper.

7. The method of claim 1, wherein the metadata comprises at least one of a number of bytes, a type of file, a creation time, a location, or a business metadata.

8. The method of claim 1, wherein at least one row of the object table is associated with a row access policy limiting access to the respective unstructured data file.

9. The method of claim 1, further comprises periodically updating, by the data processing hardware, the object table based on changes at the data repository.

10. The method of claim 9, wherein the object table is updated based on a refresh rate.

11. A system comprising:
data processing hardware; and
memory hardware in communication with the data processing hardware, the memory hardware storing instructions that, when executed by the data processing hardware, cause the data processing hardware to:
generate, using a machine learning model, an object table, wherein the object table indexes unstructured data files stored at a data repository, the object table comprising:
a plurality of rows, each row of the plurality of rows corresponds to a respective unstructured data file stored at the data repository; and
a plurality of columns, each column of the plurality of columns comprising metadata associated with the respective unstructured data file of each row of the plurality of rows;
receive, via a network, an unstructured data query from a user device executing an analytics program configured to ingest structured data tables, the unstructured data query requesting the data processing hardware extract one or more unstructured data files from the unstructured data files stored at the data repository that match query parameters;

extract, using the object table, a set of unstructured data files from the unstructured data files stored at the data repository that matches the query parameters to produce an extracted set of unstructured data files, wherein the query parameters are matched based on the metadata associated with each unstructured data file;

generate a structured data table comprising a location where each unstructured data file of the extracted set of unstructured data files is stored at the data repository and the metadata associated with each of the extracted set of unstructured data files; and return, to the user device, the structured data table, the structured data table, when received by the user device, is configured to cause the analytics program to process the extracted set of unstructured data files by way of the structured data table.

12. The system of claim 11, wherein the one or more unstructured data files comprises images or audio data.

13. The system of claim 11, wherein to extract the set of unstructured data files, for each unstructured data file of the object table the instructions further cause the data processing hardware to:

determine that the respective unstructured data file matches the query parameters based on the metadata of the respective unstructured data file; and add the respective unstructured data file to the set of unstructured data files based on a determination that the respective unstructured data file matches the query parameters.

14. The system of claim 11, wherein generate the object table occurs before receiving the unstructured data query.

15. The system of claim 11, wherein to generate the object table the instructions further cause the data processing hardware to:

select the one or more unstructured data files for the object table based on an object table query;

generate the plurality of rows based on a number of the one or more unstructured data files;

determine, using the machine learning model, the metadata included in the object table;

generate the plurality of columns based on the metadata; and populate the object table with references to the one or more unstructured data files and the metadata associated with each respective unstructured data file.

16. The system of claim 11, wherein the instructions further cause the data processing hardware to use a data scraper to generate the object table.

17. The system of claim 11, wherein the metadata comprises at least one of a number of bytes, a type of file, a creation time, a location, or a business metadata.

18. The system of claim 11, wherein at least one row of the object table is associated with a row access policy limiting access to the respective unstructured data file.

19. The system of claim 11, wherein the instructions further cause the data processing hardware to periodically update the object table based on changes at the data repository.

20. The system of claim 19, wherein the object table is updated based on a refresh rate.

* * * * *